United States Patent

Saliga

[15] 3,659,212

[45] Apr. 25, 1972

[54] NOTCH FILTER

[72] Inventor: Thomas V. Saliga, Clearwater, Fla.

[73] Assignee: Honeywell Inc., Minneapolis, Minn.

[22] Filed: June 16, 1970

[21] Appl. No.: 46,679

[52] U.S. Cl. ................................328/167, 330/126, 330/151

[51] Int. Cl. ..........................................................H03b 1/00

[58] Field of Search ..................328/165, 167; 330/107, 126, 330/151

[56] References Cited

UNITED STATES PATENTS

| | | | |
|---|---|---|---|
| 3,375,451 | 3/1968 | Borelli et al. | 328/167 |
| 3,307,408 | 3/1967 | Thomas et al | 328/167 X |
| 3,353,147 | 11/1967 | Meeker | 328/167 X |

OTHER PUBLICATIONS

Salerno, " Active Filters: Part 7 Analog Blocks Ensure Stable Design," Electronics, Feb. 17, 1969, pp. 100– 105

*Primary Examiner*—Roy Lake
*Assistant Examiner*—James B. Mullins
*Attorney*—Fred Jacob and Ronald T. Reiling

[57] ABSTRACT

A band of frequencies in a signal is suppressed by forming a passband and canceling with it a portion of the signal. The passband is formed by first passing the signal through two mixers that beat quadrature components of the signal down to baseband, then passing each of these low frequencies signals through separate low pass filters, beating the filtered signals to center frequency, and adding them together. Steep sidebands are obtained by making the low pass filters active and by a feed back that forces the phase errors to zero within the low frequency passband.

18 Claims, 5 Drawing Figures

INVENTOR.

BY

Leo Stanger

ATTORNEY

TRANSFER CHARACTERISTICS OF THE LOOP LL WHEN
K=1, N=3, $T_3$=0.19, $T_1$=$T_3$/2.5, $T_4$= $T_3$/20

INVENTOR.

BY Leo Stanger
ATTORNEY

NOTCH FILTER

BACKGROUND OF THE INVENTION

This invention relates to electric wave filters, particularly so called band elimination or notch filters which selectively suppress a band of signals.

One variety of such notch filters directs a broad band signal along two electrical paths, subjects the signal along one path to a band pass filter of selected bandwidth, and subtractively combines the signals in the two paths. This produces signal cancellation throughout the selected bandwidth. This then furnishes the desired band elimination and produces a frequency notch.

A particular type of notch filter of this variety forms the selected, subsequently cancelled, passband by dividing the second path into two sub-paths and beating the signal in each sub-path to baseband with mixing signals in phase quadrature. The separate baseband signals are each then filtered with a low pass filter. The same phase quadrature mixing signals then beat the filtered signals up to the center frequency of the notch. These signals are then added to from the selected passband. As before, the selected band is subtracted from the incoming signal to produce cancellation and hence a notch.

This method of forming the selected, subsequently cancelled, passband makes it easier to produce controlled cancellation over a narrow band; that is, a narrow band of frequencies is controlled more effectively. This is so because at zero frequency the low pass filter produces substantially no phase shift and its transfer characteristics are more easily controlled than the transfer characteristics of passband filters.

Notch filters using the two baseband sub-paths still fail to produce the selective type of suppression required by more accurate equipment. In particular they do not produce rejected bands with sufficiently steep skirts or sidebands. This may result in undesired rejection of frequencies near the notch. It can be helped by imposing filter components in the first signal path. However, such components produce overall delays which are undesirable in many applications.

THE INVENTION

According to the invention the effects of such disadvantages are avoided in circuits using this double-sub-path baseband filtering technique by producing the low pass filtering in the sub-paths with a high-gain loop.

The invention is based in part on the recognition that the sidebands are gradual because the low pass filters in the sub-paths produce phase delays that vary, from zero at zero frequency to higher values at higher frequencies, only gradually. This prevents rapid changes in cancellation at the output.

Preferably the loop forces the phase delay to zero at frequencies near zero but higher than zero.

According to another feature of the invention the loop comprises members which constitute a mathematical equivalent of a phase-lock loop. Preferably, it comprises active integrator means and feedback means.

According to still another feature of the invention the active integrator means include a plurality of operational integrators.

These and other features of the invention are pointed out in the claims. Other advantages and objects of the invention will become known from the following detailed description of embodiments of the invention when read in light of the accompanying drawings.

DETAILED DESCRIPTION OF THE DRAWING

DESCRIPTION OF THE PREFERRED EMBODIMENT

Figure 1:
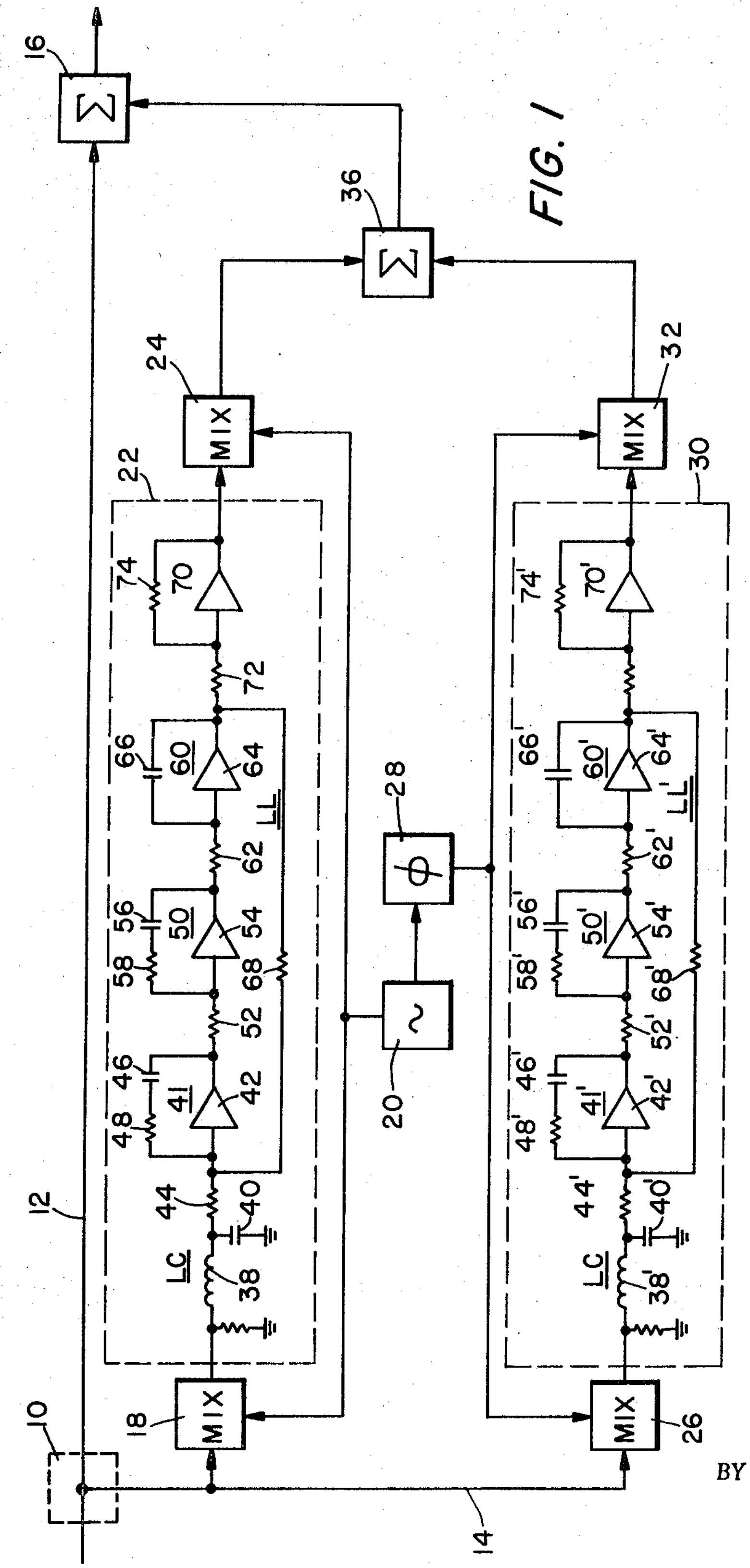
FIG. 1 is a partly schematic block diagram illustrating a filter embodying features of the invention.

In FIG. 1 a conductor junction 10 divides a broadband input signal $I_n$ into a primary path 12 and cancellation path 14. The cancellation path 14 constitutes a bandpass filter having a passband Bw about a center frequency $f_0$ as shown by curve PB in FIG. 2. A summing circuit 16 combines the passband Bw with the input signal so as to produce cancellation of signals within the range of the passband Bw and the input signal $I_n$. This produces an output signal SO having a notch N over the band $N_B$ with a bandwidth $B_w$ as shown by curve SO in FIG. 2. In this band $N_B$ signals are suppressed over the bandwidth $B_w$.

Figure 2:
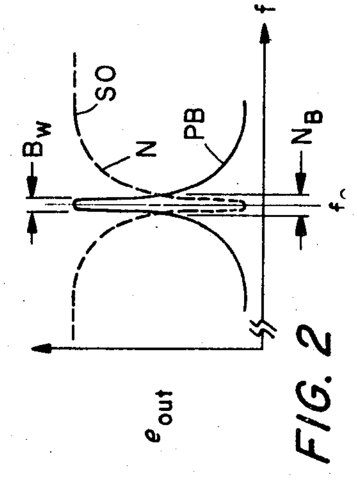
FIG. 2 is a graph illustrating the desired output of the filter in FIG. 1.
Figure 5:
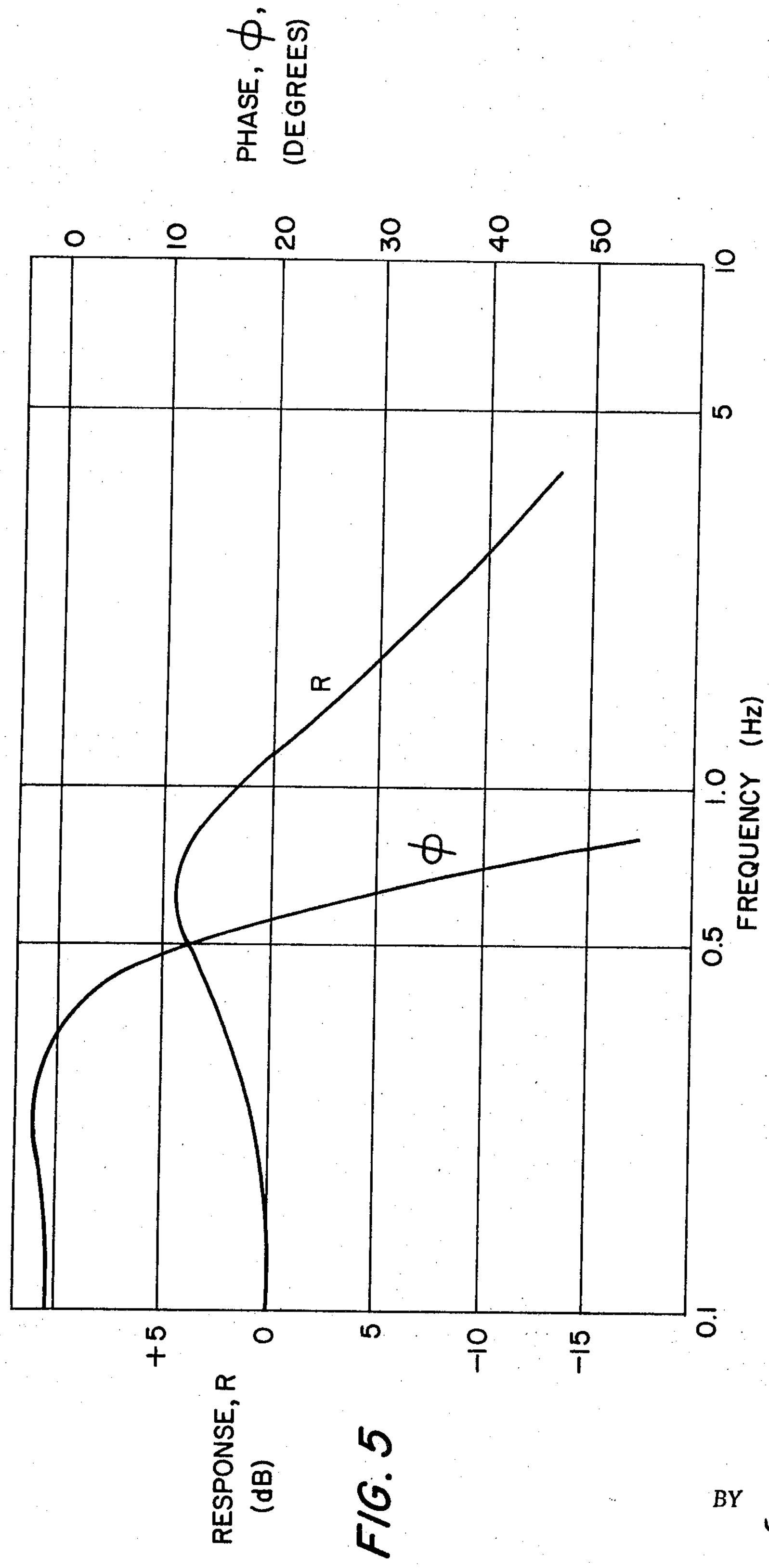
FIG. 5 is a graph illustrating the output of a loop in FIG. 4.

Within the cancellation path 14 a mixer 18 forms a beat frequency $f_{B1}$ baseband signal with the input signal $I_n$ and an oscillator 20 tuned to the frequency $f_0$. A low pass filter 22 effectively reduces the passband *Bw* to a width equal in frequency from zero cycles to one half $B_w$. A mixer 24 mixes this filtered baseband signal with the output of the oscillator 20 to beat this baseband signal up to mid band frequency $f_0$. In a similar fashion, a mixer 26 beats the input signal down to baseband with a signal at the frequency $f_0$ from a phase shifter 28 that shifts the phase from the oscillator 20, 90°. Thus, the input signal $I_n$ is mixed in the mixers 18 and 26 and beaten down to basebands by respective quadratures signals. A low pass filter 30 corresponding to the filter 22 reduces the baseband signal to a narrow frequency range from zero to one half $B_w$. The output of phase shifter 28 again causes a mixer 32 to beat the frequency up to $f_0$. A summing circuit combines the two quadrature phase signals from the mixers 24 and 32 to produce an output signal PB as shown in FIG. 2 corresponding in passband and amplitude to the desired notch depth. The summing circuit 16 combines this signal subtractively with the input signal $I_n$ to produce a notch signal N as shown in FIG. 2.

The low pass filters 22 and 30 first eliminate radio frequency signals remaining after the mixers 18 and 26, with a radio-frequency low-pass section composed of inductor 38 and capacitor 40. The output of the LC section furnishes the baseband signal to a first operational integrator 41 composed of amplifier 42, input resistor 44, integrating capacitor 46, and bridging resistor 48. A second operational integrator 50 receives the resulting signal through an input resistor 52 that supplies an amplifier 54 and bridging capacitor 56 and resistor 58. A third operational integrator 60 receives these signals. This operational integrator receives the signals through the input resistor 62 which supplies an amplifier 64 and a bridging or integrating capacitor 66. A resistor 68 forms a synthetic phase lock loop LL of the three operational integrators by passing the output of integrator 60 to the input of the amplifier 42. The resistor 68 forms a summing circuit with the resistor 44 at the input of amplifier 42. The output of the loop passes through an operational amplifier 70 having an input resistor 72 and a bridging resistor 74.

The low pass filter 30 is identical to the filter 22 and its components are identified by the same reference characters with primes. The components of the filter in FIG. 1 may for example have the following values. These values are examples only and should not be taken as limiting.

| | |
|---|---|
| inductor 38 | 270 μh |
| capacitor 46 | 0.001 μf |
| resistor 44 | 3k Ω |
| capacitor 46 | 0.01 μf |
| resistor 48 | 3k Ω |
| resistor 52 | 3k Ω |
| capacitor 56 | 0.01 μf |
| resistor 58 | 3k Ω |
| resistor 62 | 1.2k Ω |
| capacitor 66 | 0.01 μf |
| resistor 72 | 2k Ω |
| resistor 74 | 11k |

The operational integrators each exhibit Laplace transform characteristics which determine the character of the loop LL. It is these Laplace transform characteristics which define the operation and hence the values of the components in each integrator. The first and second operational integrators 41 (41') and 50 (50') in the filters 22 and 30 each has a Laplace transform characteristic $$\frac{T_1s+1}{T_1s}$$

The third operational integrator 60 (60') has the Laplace transform characteristic $$\frac{1}{T_3s}$$

With these characteristics the loop LL is mathematically equivalent to, and corresponds in response to, a third order phase lock loop. Each component corresponds in function to the function of a component in a phase lock loop and is often called a phase lock loop. To distinguish it from the usual phase lock loop it is called herein a "synthetic" phase lock loop. Phase lock loops and the relationship between the characteristics of the synthetic loop in FIG. 1 and the usual phase lock loop is shown in the book "Principles of Coherent Communication," by Andrew J. Viterbi, published in 1966 by the McGraw-Hill Book Company particularly in chapters 1 and 2. Additional operational integrators corresponding to 41 and 50 (and 41' and 50') may be added in cascade with operational integrators 41 and 50 (and 41' and 50'). Under those circumstances, the thus cascaded operational integrators exhibit the characteristics $$\left(\frac{T1s+1}{T1s}\right)^{N-1}$$

where $N$ is the order of the phase lock loop $N$ and is equal to the number of cascaded operational integrators like 41 and 50 plus the integrator 60. Thus, the loop LL is a third order loop. $N$ may of course equal 1, 2, 3 . . .

Each filters 22 and 30 is basically similar to an analog servo system making use of high gain amplifiers at low frequencies to diminish amplitude and phase errors. The RF filter composed of inductor 38 and capacitor 40 has a cut off frequency 10 to 15 times the low pass frequency or low pass cutoff frequency of the filters 22. Thus, it does not significantly influence the performance of filters 22 and 30. The time constant $T_3$ is the major time constant influencing the roll off frequency of the loop, and $S$ is the Laplace operator. The time constant $T_1$ increases the loop gain faster than *6 db* per octave for frequencies less than $11T_3$. The progression of the values of time constant is $T3<T1$.

Figure 3:
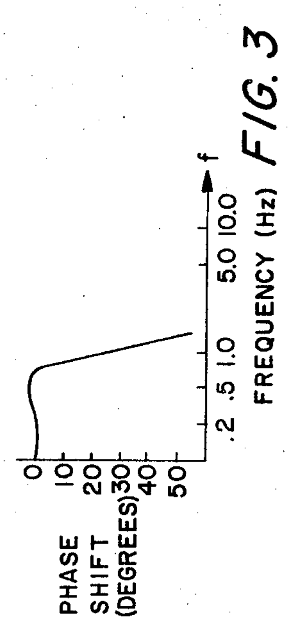
FIG. 3 is a graph illustrating the amplitude - frequency and phase - frequency characteristics of the low pass filter in FIG. 1.

If $N=1$ corresponding to the absence in each filter 22 and 30 of the first two operational integrators 41 and 50 (41' and 50') the transfer voltage or function is identical to a simple RC low pass filter with $T_3$ equal to $RC$. However, for $N>1$, the low frequency gain and the phase errors, and the high frequency attenuation is improved relative to the RC filter. The amplitude and phase response of the filter in FIG. 1 may appear as shown in FIG. 3. Here at frequencies of about 0.2 Hz and less the amplitude and phase response are quite close to an ideal zero delay filter.

The group time delay for the basic filter may be found by differentiating the phase transfer with respect to frequency. In simplified form, this constitutes $$T_d=\frac{-d\phi}{d\omega}=NT_3(\omega T_1)^{N-1}$$

for frequencies $$0<\omega<\frac{1}{T1}<\frac{1}{T_3}$$

The equivalence of the filter 22 of FIG. 1 to a phase lock loop may be more fully appreciated by consulting the book "-Principles of Coherent Communication," by Andrew J. Viterbi, published by the McGraw-Hill Book Company of New York and London in 1966, particularly in chapters 1 and 2.

Figure 4:
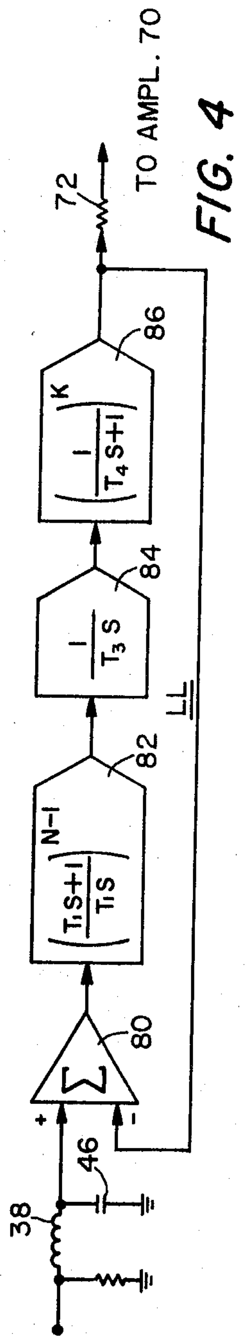
FIG. 4 is a block diagram illustrating a generalized form of a loop in FIG. 1, also embodying features of the invention.

The invention may also be practiced by substituting for the filters 22 and 30, the filter shown in block diagram form in FIG. 4. Here, a radio frequency filter LC corresponds to that of FIG. 1 and is composed of the series inductor 38 and the shunt capacitor 46. A summing circuit 80 corresponds to the summing circuit composed of the resistors 44 and 68. An active filter 82 has the Laplace transform characteristic $$\left(\frac{T_1s+1}{T_1s}\right)^{N-1}$$

when $N=3$ the filter 82 corresponds identically to the first two operational integrators 41 and 50. When the value $N=3$ it indicates that the loop LL is a third order phase lock loop corresponding to those in filters 22 and 30. An active integrator 84 with the Laplace transform characteristic $$\frac{1}{T_3s}$$

corresponds identically to the integrator 60 and performs the same function. The filter illustrated in FIG. 4 differs from the filters 22 and 30 in FIG. 1 by the addition of an operational integrator 86 in the loop after the operational integrator 60. In FIG. 4 the operational amplifier 70 is not illustrated although it can be considered a part of the integrator 86. The operational integrator 86 has the Laplace transform characteristic $$\left(\frac{1}{T_4s+1}\right)^K$$

where K may be equal to 0, 1, 2, etc. The value $T_4$ is less than the value $T_3$ and causes the loop gain to fall off faster than 6 decibels per octave for frequencies greater than $1/T_3$. This high frequency roll off may be interpreted as natural roll offs occurring in operational amplifiers or as a time constant intentionally placed therefore added roll offs. From before it follows that the progression of time constants is $T_4<T_3<T_1$.

Again, this corresponds to an $N$ order phase lock loop where $N$ may take on the values 1, 2, 3, . . . and $K$ may take on the values 0, 1, 2, 3 . . . Generally, using greater than a fourth order loop gains little additional improvement.

As stated before in FIG. 1 and is applicable here in FIG. 3 when $N=1$ and $K=0$ the transfer characteristic $V_{out}/V_{in}$ is again identical to a simple RC low pass filter with $T_3$ equal to $R3$.

As a result of the invention the notch filter of FIG. 1 produces sidebands which are steeper than those available in other notch filters. It allows this filter to suppress specific frequencies and pass adjacent frequencies with much greater assurance than in similar devices. Also the frequency of the notch can be changed with little variation in notch shape by changing the frequency of the oscillator 20.

While embodiments of the invention have been described in detail, it will be obvious to those skilled in the art that the invention may be embodied otherwise within its spirit and scope.

What is claimed is:

1. A notch filter circuit comprising signal input means, a first path and a second path connected to said input means, summing means at the end of the first path and the second path for causing cancellation of signals in the two paths, said second path including mixing means for beating an input signal to baseband, low pass filter means for passing a portion of the signal at said mixing means, regenerating means for taking the signal at the output of said low pass filter means and mixing it to a frequency corresponding to the input frequency of the signal, said low pass filter means including amplifying integrator means having an input and an output, summing means at the input of said amplifying integrator means, and loop return means for passing the signal at the output of said amplifying integrator means to said summing means.

2. A circuit as in claim 1 wherein said amplifying integrator means includes at least one operational integrator.

3. A circuit as in claim 2 wherein said operational amplifier includes means for generating a Laplace transfer characteristic defined by $$\frac{1}{T_3s}$$

wherein $T_3$ is the major time constant influencing the roll off frequency of the loop, and s is the Laplace operator.

4. A circuit as in claim 2 wherein said amplifying integrator means includes a plurality of operational integrators, one of said operational amplifiers having means for generating the Laplace transform characteristic $$\frac{1}{T_3s}$$

, wherein $T_3$ is the major time constant influencing the roll off frequency of the loop, and $s$ is the Laplace operator.

5. A circuit as in claim 4 wherein another said operational amplifier has means for generating a Laplace transform characteristic $$\frac{T_1s+1}{T_1s}$$

, wherein $T_1$ is a time constant greater than $T_3$.

6. A circuit as in claim 5 wherein said amplifying integrator means includes a third operational integrator having means for generating the characteristic $$\frac{1}{T_4s+1}$$

, wherein $T_4$ is a time constant smaller than $T_1$ and $T_3$.

7. A circuit as in claim 2 wherein said amplifying integrating means includes a first section, a second section, and a third section each in cascade, said first section having means for generating a transfer characteristic $$\left(\frac{T_1s+1}{T_1s}\right)^{N-1}$$

where $N$ equals 1, 2, 3, . . . and $T_1$ is a time constant, and $s$ is the Laplace operator.

8. A circuit as recited in claim 7 wherein said second section has means for generating a characteristic $$\frac{1}{T_3s}$$

, wherein $T_3$ is a time constant which is smaller than $T_1$.

9. A circuit as in claim 8 wherein said third section has means for generating a characteristic $$\left(\frac{1}{T_4s+1}\right)^{K}$$

where $K$ equals 0, 1, 2, 3, 4, . . . , and $T_4$ is a time constant which is smaller than $T_1$ and $T_3$.

10. A notch filter circuit comprising signal input means, a first path and a second path connected to said input means, summing means at the end of the first path and the second path for causing cancellation of signals in the two paths, said second path including first mixing means for beating an input signal to baseband, first low pass filter means for passing a portion of the signal at said mixing means, first regenerating means for taking the signal at the output of said low pass filter means and mixing it to a frequency corresponding to the input frequency of the signal, said low pass filter means including amplifying integrating means having an input and an output, summing means at the input of said amplifying means and loop return means for passing the signal at the output of said amplifying integrating means to said summing means, said second path including a second mixing means for beating the input signal down to baseband in phase quadrature with said first mixing means, second low pass filter means corresponding to said first low pass filter means and being substantially identical thereto, second regenerating means for converting the signal of the output of said second low pass filter and mixing it to a frequency corresponding to the input frequency of the signal, and summing means at the end of said first regenerating means and second regenerating means for combining the two quadrature phase signals from first and second regenerating means producing an output signal corresponding in passband and amplitude to a desired notch depth.

11. A circuit as in claim 10 wherein said amplifying integrator means includes at least one operational integrator.

12. A circuit as in claim 10 wherein said operational amplifier has means for generating a Laplace transfer characteristic defined by $$\frac{1}{T_3s}$$

, wherein $T_3$ is a major time constant influencing roll off frequency of the loop, and s is the Laplace operator.

13. A circuit as in claim 10 wherein said amplifying integrator means includes a plurality of operational integrators, one of said operational amplifiers having means for generating the Laplace transform characteristic $$\frac{1}{T_3s}$$

, wherein $T_3$ is the major time constant influencing the roll off frequency of the loop, and s is the Laplace operator.

14. A circuit as in claim 10 wherein another said operational amplifier has means for generating a Laplace transform characteristic $$\frac{T_1s+1}{T_1s}$$

, and wherein $T_1$ is a time constant which increases the loop gain faster than 6 db per octave for frequencies less than $11T_3$ where $T_3$ is the major time constant influencing the roll off frequency of the loop, and s is the Laplace operator.

15. A circuit as in claim 10 wherein said amplifying integrator means includes a third operational integrator having means for generating the characteristic $$\frac{1}{T_4s+1}$$

, wherein $T_4$ is a time constant, and s is the Laplace operator.

16. A circuit as in claim 10 wherein said amplifying integrating means includes a first section, a second section, and a third section each in cascade, said first section having means for generating a transfer characteristic $$\left(\frac{T_1s+1}{T_1s}\right)^{N-1}$$

where $N$ equals 1, 2, 3, . . . , and wherein $T_1$ is a time constant which increases the loop gain faster than 6 db per octave for frequencies less than $11T_3$, where $T_3$ is the major time constant influencing the roll off frequency of the loop, and $s$ is the Laplace operator.

17. A circuit as in claim 10 wherein said second section has means for generating a characteristic $$\frac{1}{T_3s}$$

, where $T_3$ is the major time constant influencing the roll off frequency of the loop, and s is the Laplace operator.

18. A circuit as in claim 10 wherein said third section has means for generating a characteristic $$\left(\frac{1}{T_4s+1}\right)^{K}$$

where $K$ equals 0, 1, 2, 3, 4, . . . , and where $T_4$ is a time constant, and s is a Laplace operator.

* * * * *